United States Patent
Best et al.

(10) Patent No.: US 12,323,418 B2
(45) Date of Patent: Jun. 3, 2025

(54) AUTHENTICATION TIMERS

(71) Applicant: Cryptography Research, Inc., San Jose, CA (US)

(72) Inventors: Scott C. Best, Palo Alto, CA (US); Matthew E. Orzen, San Francisco, CA (US)

(73) Assignee: Cryptography Research, Inc., San Jose, CA (US)

( * ) Notice: Subject to any disclaimer, the term of this patent is extended or adjusted under 35 U.S.C. 154(b) by 226 days.

(21) Appl. No.: 17/792,090

(22) PCT Filed: Jan. 11, 2021

(86) PCT No.: PCT/US2021/012906
§ 371 (c)(1),
(2) Date: Jul. 11, 2022

(87) PCT Pub. No.: WO2021/150389
PCT Pub. Date: Jul. 29, 2021

(65) Prior Publication Data
US 2023/0047564 A1    Feb. 16, 2023

Related U.S. Application Data

(60) Provisional application No. 62/965,659, filed on Jan. 24, 2020.

(51) Int. Cl.
*H04L 9/40*       (2022.01)
*G06F 21/44*     (2013.01)

(52) U.S. Cl.
CPC .......... *H04L 63/0853* (2013.01); *G06F 21/44* (2013.01); *G06F 2221/2103* (2013.01)

(58) Field of Classification Search
CPC ... H04L 63/0853; H04L 9/3271; G06F 21/44; G06F 2221/2103
See application file for complete search history.

(56) References Cited

U.S. PATENT DOCUMENTS

| | | | |
|---|---|---|---|
| 7,747,887 B2 | 6/2010 | Shipton et al. | |
| 9,121,873 B2 | 9/2015 | Satoh et al. | |
| 9,805,228 B2 | 10/2017 | Janssens | |
| 9,878,555 B2 | 1/2018 | Ward et al. | |
| 9,991,705 B2 * | 6/2018 | Quadrini | H02J 3/24 |

(Continued)

OTHER PUBLICATIONS

Notification of Transmittal of the International Search Report and the Written Opinion of the International Searching Authority, or the Declaration with Mail Date Apr. 2, 2021 re: Int'l Appln. No. PCT/US2021/012906. 9 pages.

*Primary Examiner* — Sm A Rahman
(74) *Attorney, Agent, or Firm* — The Neudeck Law Firm, LLC

(57) ABSTRACT

A first device transmits a first message to a second device as part of a challenge-response protocol in order to authenticate the second device. A power limited power supply coupled to the second device limits power consumption by the second device during the second device's challenge-response protocol calculations. The first device measures a response time of the second device during the challenge-response protocol. The authentication of the second device is based on the response time of the second device while it has limited power consumption.

20 Claims, 7 Drawing Sheets

(56) References Cited

U.S. PATENT DOCUMENTS

| | | | |
|---|---|---|---|
| 11,962,574 B2* | 4/2024 | Proulx | H04L 63/0876 |
| 2017/0332235 A1 | 11/2017 | Smith et al. | |
| 2018/0335514 A1* | 11/2018 | Dees | G01S 13/765 |
| 2019/0111693 A1 | 4/2019 | Ward et al. | |
| 2020/0153642 A1* | 5/2020 | Vokkarne | H04L 9/3271 |

* cited by examiner

```
┌─────────────────────────────────────────────────────────────┐
│  PROVIDE A POWER LIMITED POWER SUPPLY TO A FIRST DEVICE TO  │
│                    BE AUTHENTICATED                         │
│                                                             │
│                          502                                │
└─────────────────────────────────────────────────────────────┘
                              │
                              ▼
┌─────────────────────────────────────────────────────────────┐
│  TRANSMIT A FIRST CHALLENGE-RESPONSE PROTOCOL MESSAGE TO    │
│    THE FIRST DEVICE IN ORDER TO CAUSE THE FIRST DEVICE TO   │
│    PERFORM CHALLENGE-RESPONSE PROTOCOL CALCULATIONS         │
│                                                             │
│                          504                                │
└─────────────────────────────────────────────────────────────┘
                              │
                              ▼
┌─────────────────────────────────────────────────────────────┐
│    RECEIVE, FROM THE FIRST DEVICE, A SECOND CHALLENGE-      │
│    RESPONSE PROTOCOL MESSAGE THAT IS BASED ON THE           │
│       CHALLENGE-RESPONSE PROTOCOL CALCULATIONS              │
│                                                             │
│                          506                                │
└─────────────────────────────────────────────────────────────┘
                              │
                              ▼
┌─────────────────────────────────────────────────────────────┐
│   TIME AN INTERVAL ASSOCIATED WITH A TIME BETWEEN THE       │
│   TRANSMITTING OF THE FIRST CHALLENGE-RESPONSE PROTOCOL     │
│   MESSAGE AND RECEIVING THE SECOND CHALLENGE-RESPONSE       │
│                    PROTOCOL MESSAGE.                        │
│                                                             │
│                          508                                │
└─────────────────────────────────────────────────────────────┘
```

*FIG. 5*

AUTHENTICATION TIMERS

BRIEF DESCRIPTION OF THE DRAWINGS

FIG. 5 is a flowchart illustrating a method of authenticating a device.

DETAILED DESCRIPTION OF THE EMBODIMENTS

Figure 1:
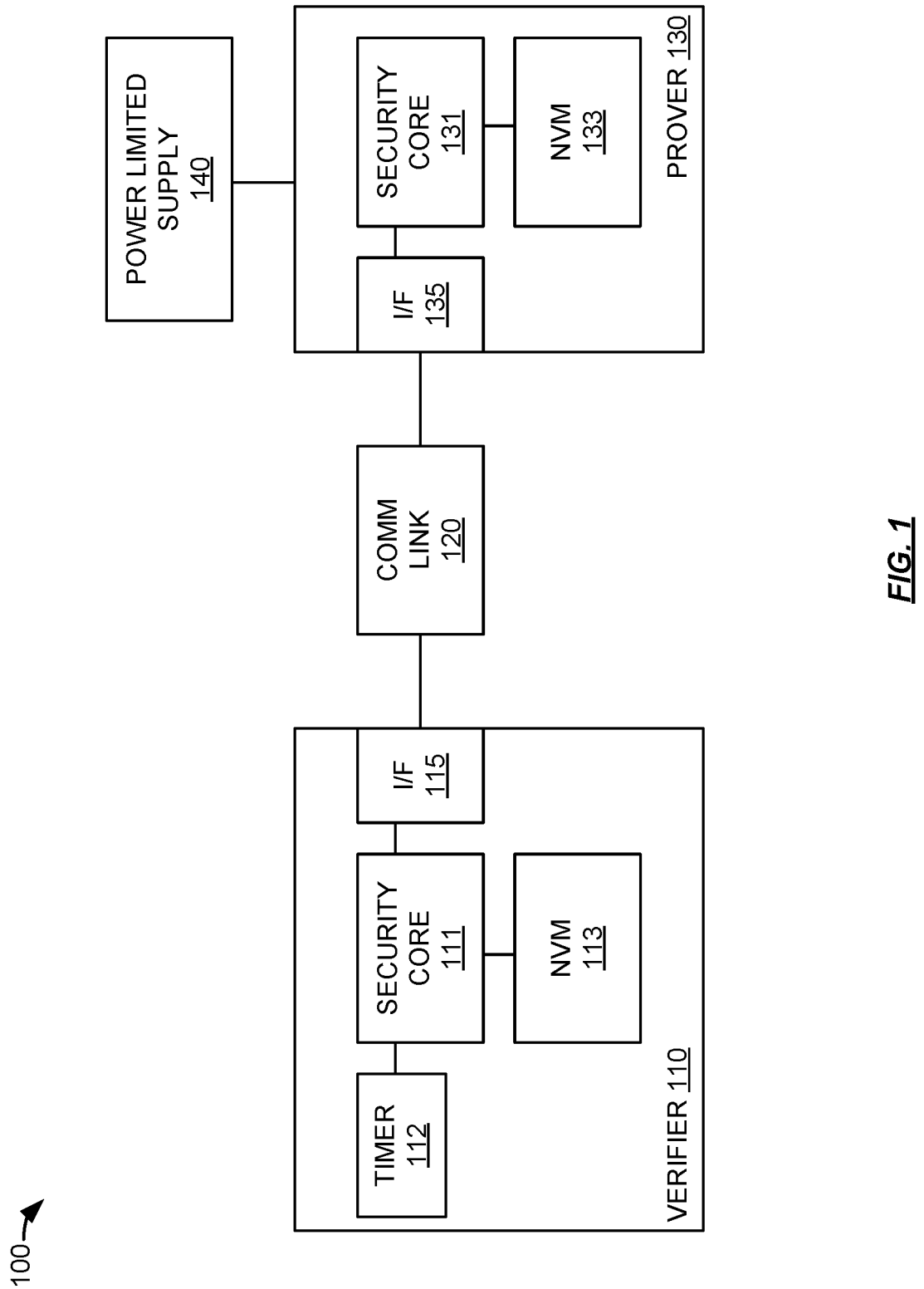
FIG. 1 is a block diagram illustrating an authentication system.

In some authentication systems—such as ones used in anti-counterfeiting applications—it is common for a verifying entity (e.g., an integrated circuit and/or processor) to "challenge" a prover entity (e.g., another integrated circuit or processor) to confirm the authenticity of the system that includes the prover entity. This may be accomplished by the verifying entity providing a numerical value to the prover entity as part of a challenge message. The prover chip completes a calculation that combines the provided value with some secret value (e.g., a secret value stored within the prover chip's netlist or non-volatile memory) that only an authentic prover chip should know. After the calculation is complete, the prover chip can indicate authenticity by returning a response message with the calculation's result to the verifier chip. This authentication process may be referred to as a challenge-response protocol.

To complete the calculation that combines the provided value with the secret value, the prover chip's circuits must consume power. The power consumed is typically a function based on the capacitance "C" of the circuits (primarily determined by the manufacturing process used to create the transistors in the circuits as well as the interconnect between them), the voltage "V" that powers the circuits, and the operating frequency "F" of the calculations. To a first order, the power consumption scales along the formula $CV^2F$.

In an embodiment, the verifying chip measures the time interval between the transmitting of the challenge message and the receipt of the response message while concurrently having the power consumption of the prover entity limited to a selected value (e.g., $P_{limit}$). The selected power limit value, $P_{limit}$, is selected to approximate the power consumed by an authentic chip.

If the interval for receipt of the response message falls inside of an expected window of time, the verifying entity indicates the candidate prover entity is authentic. Conversely, if the interval for receipt of the response message falls outside the expected window of time (or no response message is received), the verifying entity indicates the candidate prover entity is not authentic. The frequency ($F_{fake}$) component of a counterfeit chip's power consumption ($P_{fake}=C_{fake}V^2F_{fake}$) that causes the response to be sent within the expected window may not be compatible with a frequency value that results in a power consumption that is less than the limited power provided (i.e., $P_{fake}<P_{limit}$.) A counterfeit chip that is not supplied its required amount of power is likely to fail or to produce an incorrect response.

Note also that it is difficult to manufacture a counterfeit chip in a semiconductor process different from an authentic chip (i.e., where $C_{fake} \neq C_{authentic}$) such that the two chips consume the same amount of power for the same frequency of operation. Thus, the difficulty in producing a fully functional counterfeit chip is increased because multiple additional constraints are required rather than simply the correct response value.

FIG. 1 is a block diagram illustrating an authentication system. In FIG. 1, system 100 includes verifier 110, communication link 120, prover 130, and power limited power supply 140. Verifier includes security core 111, timer 112, nonvolatile memory (NVM) 113, and interface 115. Prover includes security core 131, nonvolatile memory (NVM) 133, and interface 135.

Verifier 110 is operatively coupled to prover 130 via communication link 120. Verifier 110 is operatively coupled to prover 130 to transmit, via communication link 120, a challenge message of a challenge-response authentication protocol to prover 130. Prover 130 is operatively coupled to verifier 110 via communication link 120 to receive a challenge message from verifier 110. Prover 130, after performing the challenge-response calculations, transmits a response message to verifier 110 via communication link 120 with the results of the challenge-response calculations.

Communication link 120 is a network that can provide wired and/or wireless communication between verifier 110 and prover 130. Communication link 120 and can comprise wired and/or wireless communication networks that include host systems, host processors, integrated circuits, buffers, processing nodes, routers, gateways, physical and/or wireless data links for carrying data among various network elements, including combinations thereof, and can include one or more wired busses such as I2C, SPI, 1-wire, PCI, USB, etc., a local area network, a wide area network, and an internetwork (including the Internet). Parts of communication link of 120, can be, for example, printed circuit board traces, connectors, antennas, twisted pair cable, coaxial cable or fiber optic cable, or combinations thereof.

Power limited power supply 140 is operatively coupled to prover 130. In an embodiment, power limited power supply 140 supplies prover 130 with a supply voltage that, at least during the calculation of the response to the challenge message, can only deliver a limited amount of current at a given supply voltage. Thus, for example, when prover 130 tries to exceed the set limit of power limited power supply 140, power limited power supply may reduce the voltage and/or current provided to prover 130 in order to maintain a constant power consumption (e.g., $P_{limit}=I_{supplied} \times V_{supplied}$). In another example, when prover 130 tries to exceed the current limit of power limited power supply 140, the voltage provided by the regulated power supply (a.k.a., voltage regulator) might naturally reduce due to current overload.

Verifier 110 and prover 130 may be, or be part of, integrated circuit type devices, such as are commonly referred to as a "chips". A verifier, such as verifier 110, is an entity that manages and transmits the "challenge" part of a challenge-response protocol. Challenge— response authentication is a family of protocols in which one party (e.g., verifier 110) presents a question (a.k.a., "challenge" or "challenge message") and another party (e.g., prover 130) must provide a valid answer (a.k.a., "response", "response value", or "response message") to be authenticated. A verifier can be a separate, standalone chip, or as a circuit integrated into another chip. A verifier might also be realized primarily in software running in a microprocessor. For example, a verifier may be included on a single die with additional microprocessor cores, or included as part of a more complex integrated circuit system such as a block of a system on a chip (e.g., an SoC within a printer, an SoC within a cellphone, or an SoC within an automotive local-interconnect network master).

A prover, such as prover 130, is an entity that receives, performs calculations, and responds to the "challenge" part of a challenge-response protocol with the "response" part of the protocol. A prover can be a separate, standalone chip, or a circuit integrated into another chip. A prover might also be realized primarily in software running in a microprocessor. For example, a prover may be included on a single die with additional microprocessor cores, or included as part of a more complex integrated circuit system such as a block of a system on a chip (SoC). A prover may be a chip that is included on a larger electrical, mechanical, or both, system that is prone to counterfeiting attacks (e.g., a printer cartridge, a rechargeable battery, an automotive subsystem, etc.) to prove the authenticity of the larger system.

In an embodiment, verifier 110 includes NVM 113 to store secret data to be used as part of a cryptographic calculation associated with a challenge-response protocol. Likewise, prover 130 includes NVM 133 to store secret data to be used as part of a cryptographic calculation associated with providing a challenge-response protocol response. Verifier 110 uses timer 112 to measure an interval between the transmission of a challenge message to prover 130 and the reception of the response from prover 130. In addition to verifying whether the response value from prover 130 is correct (or not correct), verifier 110 evaluates whether the measured interval falls within a specified range.

For example, if an authentic prover 130 takes 100,000 verifier 110 clock cycles to complete an authentic challenge-response protocol calculation, verifier 110 may evaluate the interval measured by timer 112 to determine whether the interval falls between 90,000 and 110,000 verifier 110 clock cycles. An interval that falls outside of this range indicates to verifier 110 that prover 130 was completing the challenge-response calculations either too slowly or too rapidly—thereby indicating prover 130 is not authentic. Note that in some embodiments, the prover and verifier may support multiple different algorithms which can be used to derive values needed for the challenge-response protocol calculation, and each of these different algorithms may complete in a different number of clock cycles. For example, a first algorithm might take 100,000 verifier 110 clock cycles, while a second algorithm might take 120,000 cycles. In these embodiments, the verifier 110 may evaluate the interval measured by timer 112 with different ranges for each algorithm (e.g., an interval between 90,000 and 110,000 for the first algorithm, between 110,000 and 130,000 for the second algorithm, etc.)

In some embodiments, the verifier 110 and prover 130 may be running at the same clock frequency. In should be understood that this is not necessary. Verifier 110 and prover 130 need only be running at frequencies and/or performance ratio(s) that are known beforehand to the authentic system integrator. In an embodiment, the +/− range of the measured timer interval that indicates a prover 130 is authentic (e.g., ±10% in the example) may be optionally programmed into verifier 110 after deployment (e.g., to account for manufacturing variation between prover 130 and verifier 110, new/different designs, and/or new/different manufacturing processes).

In an embodiment, power limited power supply 140 is coupled to prover 130 to limit power consumption by prover during challenge-response protocol calculations. While the power to prover 130 is being limited, verifier 110 transmits a challenge message to prover 130 as part of a challenge-response protocol in order to authenticate prover 130. Verifier 110 measures a response time of prover 130 during the challenge-response protocol. The authentication of prover 130 is based on the response time of prover 130.

In an embodiment, communication link 120 includes a host system to relay communication between verifier 110 and prover 130. The host system may control power limited power supply 140 to limit the power consumption by prover 130. In an embodiment, verifier 110 may indicate to the host system a power limit for the power consumption by prover 130. In an embodiment, the host system may monitor, rather than limit, the power consumption by prover 130. In this case, the host system may determine whether prover 130 has consumed too much, or too little, power to indicate prover 130 is authentic. In another embodiment, verifier 110 may transmit a second message to prover 130 to indicate a clock frequency to be used by prover 130 during challenge-response protocol calculations.

In an embodiment, power limited power supply 140 provides a power limited power supply to prover 130 which is to be authenticated. Optionally, verifier 110 may transmit a challenge-response protocol message to prover 130 to cause prover 130 to perform challenge-response protocol calculations using a selected clock frequency.

Verifier 110 transmits a first challenge-response protocol message to prover 130 in order to cause prover 130 to perform challenge-response protocol calculations. Verifier 110 receives, from prover 130, a second challenge-response protocol message that is based on the challenge-response protocol calculations (and NVM secret value) performed by prover 130. Verifier 110 also times an interval associated with the time between the transmitting of the first challenge-response protocol message and the receiving of the second challenge-response protocol message. Based on the interval associated with the time between the transmitting of the first challenge-response protocol message and the receiving of the second challenge-response protocol message, verifier 110 determines that prover 130 is indicated to be (or is) authentic (or not authentic.)

In an embodiment, verifier 110 uses interface 115 to transmit a first challenge-response protocol message and to receive a second challenge-response protocol message from prover 130 which is being powered by power limited power supply 140. Optionally, interface 115 transmits a message to select a clock frequency that prover 130 is to use to calculate at least a part of the second challenge-response protocol message. In an embodiment, this clock-frequency selection message can be derived from the first challenge-response protocol message, and/or concealed within the first or other messages exchanged during the protocol. In some embodiments, the messages exchanged between the verifier 110 and prover 130 are also used to select what algorithms will be used for the calculation of values need for the challenge-response protocol. Verifier 110 uses timer 112 to measure a time interval associated with the time between the transmission of the first challenge-response protocol message and the receiving of the second challenge-response protocol message from prover 130.

Verifier 110 may also use the first interface is to transmit an indicator of a power limit of power limited power supply 140. This indicator of the power limit of power limited power supply 140 may be transmitted to a host system. In particular, the host system may control the power limit of power limited power supply 140.

Figure 2:
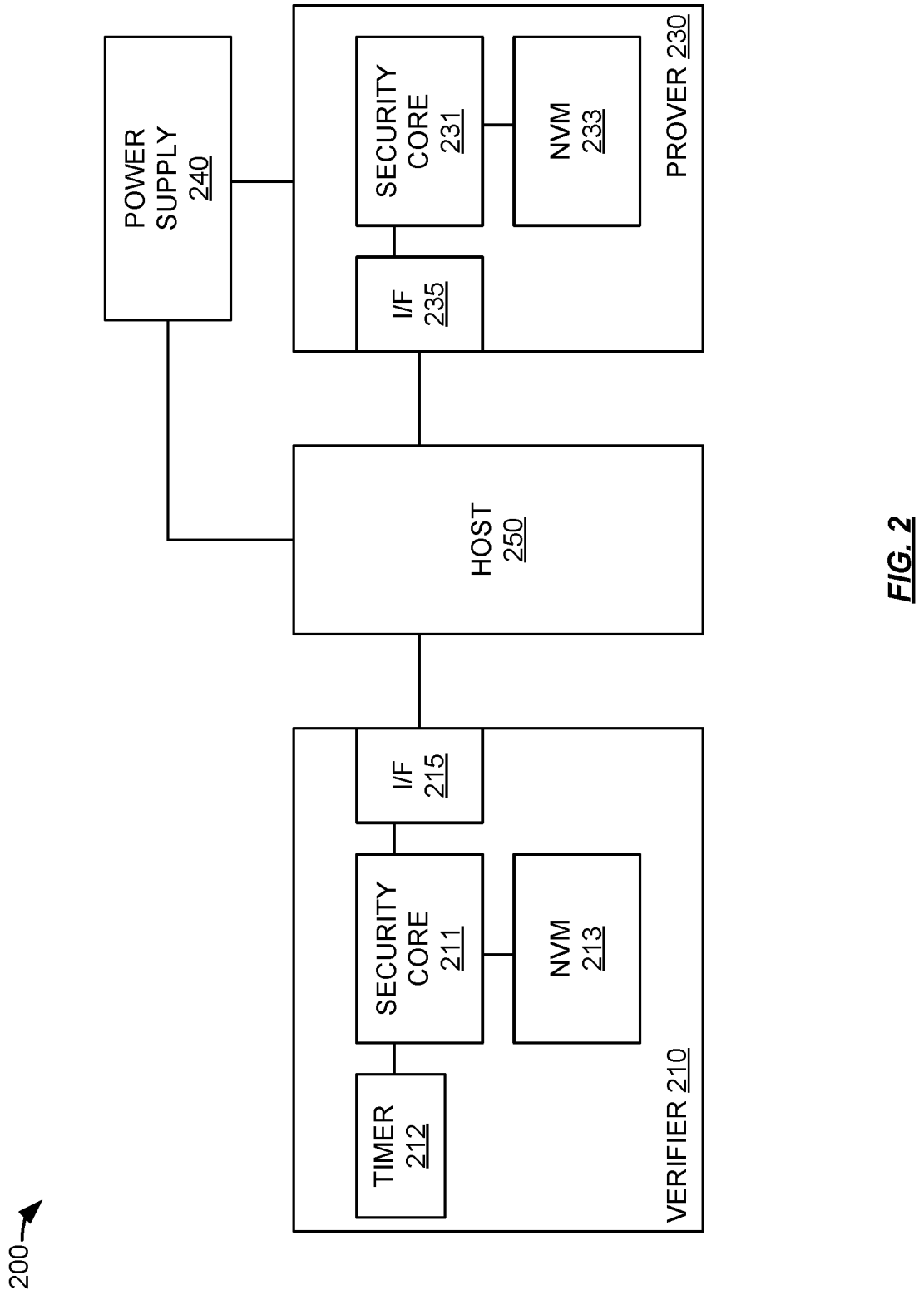
FIG. 2 is a block diagram illustrating a host relayed authentication system.

FIG. 2 is a block diagram illustrating a host relayed authentication system. In FIG. 2, system 200 includes verifier 210, host 250, prover 230, and power supply 240. Verifier includes security core 211, timer 212, nonvolatile memory (NVM) 213, and interface 215. Prover includes security core 231, nonvolatile memory (NVM) 233, and interface 235.

Verifier 210 is operatively coupled to host 250 via interface 215. Prover 230 is operatively coupled to host 250 via interface 235. Verifier 210 is operatively coupled to host 250 to transmit a challenge message of a challenge-response authentication protocol to prover 230 via host 250. Prover 230 is operatively coupled to host 250 to receive a challenge message from verifier 210 via host 250. Prover 230, after performing the challenge-response calculations, transmits a response message to verifier 210 via host 250 with the results of the challenge-response calculations. Verifier 210 and/or prover 230 may be operatively coupled to host 250 via one or more wired busses such as I2C, SPI, 1-wire, PCI, USB, etc., Power supply 240 is operatively coupled to host 250 and prover 230. In an embodiment, power supply 240 supplies prover 230 with a supply voltage that, at least during the calculation of the response to the challenge message, has limited current at a given supply voltage. Thus, for example, when prover 230 tries to exceed the set limit of power supply 240, power supply 240 may reduce the voltage and/or current provided to prover 230 in order to maintain a constant power consumption (e.g., $P_{limit} = I_{supplied} \times V_{supplied}$.) In another example, when prover 230 tries to exceed the current limit of power limited power supply 240, the voltage provided by the regulated power supply (a.k.a., voltage regulator) might naturally reduce due to current overload. In an embodiment, host 250 determines the set limit of power supply 240.

In another embodiment, power supply 240 does not have a pre-set or pre-specified power limit to supply prover 230. Rather, power supply 240 provides one or more indicators of the power consumed by prover 230 during challenge-response calculations. These one or more indicators may be used by host 250 and/or verifier 210 to determine whether the power consumed by prover 230 meets one or more power consumption criteria (e.g., a window) that indicates prover 230 is authentic.

In an embodiment, verifier 210 includes NVM 213 to store secret data to be used as part of a cryptographic calculation associated with a challenge-response protocol. Likewise, prover 230 includes NVM 233 to store secret data to be used as part of a cryptographic calculation associated with providing a challenge-response protocol response. Verifier 210 uses timer 212 to measure an interval between the transmission of a challenge message to prover 230 and the reception of the response from prover 230. In addition to verifying whether the response value from prover 230 is correct (or not correct), verifier 210 evaluates whether the measured interval falls within a specified range. An interval that falls outside of the specified range indicates to verifier 210 that prover 230 was completing the challenge-response calculations either too slowly or too rapidly—thereby indicating prover 230 is not authentic.

In some embodiments, the verifier 210 and prover 230 may be running at the same clock frequency. In should be understood that this is not necessary. Verifier 210 and prover 230 need only be running at frequencies and/or performance ratio(s) that are known beforehand to the authentic system integrator. In an embodiment, the +/− range of the measured timer interval that indicates a prover 230 is authentic (e.g., ±10%) may be optionally programmed into verifier 210 after deployment (e.g., to account for manufacturing variation between prover 230 and verifier 210, new/different designs, and/or new/different manufacturing processes).

In an embodiment, power supply 240 is coupled to prover 230 to limit power consumption by prover during challenge-response protocol calculations. While the power to prover 230 is being limited, verifier 210 transmits a challenge message to prover 230 as part of a challenge-response protocol in order to authenticate prover 230. Verifier 210 measures a response time of prover 230 during the challenge-response protocol. The authentication of prover 230 is based on the response time of prover 230.

In an embodiment, host 250 may control power supply 240 to limit the power consumption by prover 230. In an embodiment, verifier 210 may indicate to host system 250 a power limit for the power consumption by prover 230. In an embodiment, host 250 may monitor, rather than limit, the power consumption by prover 230. In this case, host 250 and/or verifier 210 may determine whether prover 230 has consumed too much, or too little, power to indicate that prover 230 is authentic. In another embodiment, verifier 210 may a second message to prover 230 to indicate a clock frequency to be used by prover 230 during challenge-response protocol calculations.

In an embodiment, power supply 240 provides a power limited power supply to prover 230, which is to be authenticated. Optionally, verifier 210 may transmit a message to prover 230 to cause prover 230 to perform challenge-response protocol calculations using a selected clock frequency.

Verifier 210 transmits a first challenge-response protocol message to prover 230 in order to cause prover 230 to perform challenge-response protocol calculations. Verifier 210 receives, from prover 230, a second challenge-response protocol message that is based on the challenge-response protocol calculations (and NVM secret value) performed by prover 230. Verifier 210 also user timer 212 to measure an interval associated with the time between the transmitting of the first challenge-response protocol message and the receiving of the second challenge-response protocol message. Based on the interval associated with the time between the transmitting of the first challenge-response protocol message, and the receiving of the second challenge-response protocol message, verifier 210 determines whether prover 230 is to be indicated to be authentic.

In an embodiment, verifier 210 uses interface 215 to transmit a first challenge-response protocol message and to receive a second challenge-response protocol message from prover 230, which is being powered by power supply 240. Optionally, interface 215 transmits a message to select a clock frequency that prover 230 is to use to calculate at least a part of the second challenge-response protocol message. In an embodiment, this clock-frequency selection message can be derived from the first challenge-response protocol message, and/or concealed within the first or other messages exchanged during the protocol. In some embodiments, the messages exchanged between the verifier 110 and prover 130 are also used to select what algorithms will be used for the calculation of values need for the challenge-response protocol. Verifier 210 uses timer 212 to measure a time interval associated with the time between the transmission of the first challenge-response protocol message and the receiving of the second challenge-response protocol message from prover 230.

Verifier 210 may also use the first interface to transmit an indicator of a power limit to power supply 240. This indicator of the power limit of power supply 240 may be transmitted via host 250. In particular, host 250 may control the power limit of power supply 240.

Figure 3:
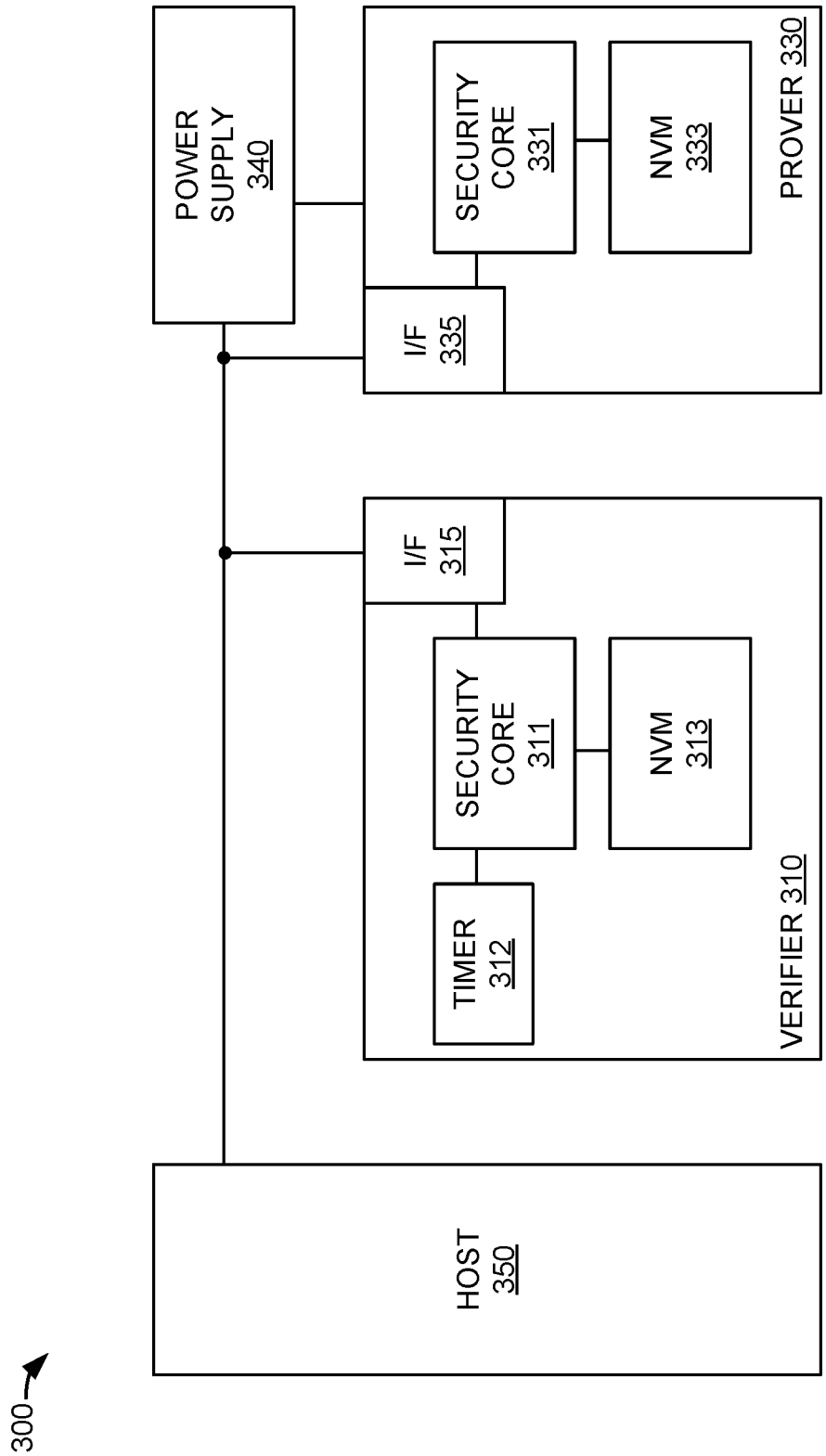
FIG. 3 is a block diagram illustrating a host assisted authentication system.

FIG. 3 is a block diagram illustrating a host assisted authentication system. In FIG. 3, system 300 includes verifier 310, host 350, prover 330, and power supply 340. Verifier includes security core 311, timer 312, nonvolatile memory (NVM) 313, and interface 315. Prover includes security core 331, nonvolatile memory (NVM) 333, and interface 335.

Verifier 310 is operatively coupled to host 350, prover 330, and power supply 340 via interface 315. Prover 330 is operatively coupled to host 350, verifier 310, and power supply 340 via interface 335. Verifier 310 is operatively coupled to prover 330 to transmit a challenge message of a challenge-response authentication protocol to prover 330 via interface 315. Prover 330 is operatively coupled to verifier 310 to receive a challenge message from verifier 310 via interface 335. Prover 330, after performing the challenge-response calculations, transmits a response message to verifier 310 via interface 335 with the results of the challenge-response calculations. Verifier 310, power supply 340, and/or prover 330 may be operatively coupled to host 350 and each other via one or more wired busses such as I2C, SPI, 1-wire, PCI, USB, etc., In an embodiment, power supply 340 supplies prover 330 with a supply voltage that, at least during the calculation of the response to the challenge message, has limited current at a given supply voltage. Thus, for example, when prover 330 tries to exceed the set limit of power supply 340, power supply 340 may reduce the voltage and/or current provided to prover 330 in order to maintain a constant power consumption (e.g., $P_{limit}=I_{supplied} \times V_{supplied}$.) In another example, when prover 330 tries to exceed the current limit of power limited power supply 340, the voltage provided by the regulated power supply (a.k.a., voltage regulator) might naturally reduce due to current overload. In an embodiment, host 350 determines the set limit of power supply 340. In another embodiment, verifier 310 determines the set limit of power supply 340.

In an embodiment, power supply 340 does not have a pre-set or pre-specified power limit to supply prover 330. Rather, power supply 340 provides one or more indicators of the power consumed by prover 330 during challenge-response calculations. These one or more indicators may be used by host 350 and/or verifier 310 to determine whether the power consumed by prover 330 meets one or more power consumption criteria (e.g., a window) that indicates prover 330 is authentic.

In an embodiment, verifier 310 includes NVM 313 to store secret data to be used as part of a cryptographic calculation associated with a challenge-response protocol. Likewise, prover 330 includes NVM 333 to store secret data to be used as part of a cryptographic calculation associated with providing a challenge-response protocol response. Verifier 310 uses timer 312 to measure an interval between the transmission of a challenge message to prover 330 and the reception of the response from prover 330. In addition to verifying whether the response value from prover 330 is correct (or not correct), verifier 310 evaluates whether the measured interval falls within a specified range. An interval that falls outside of the specified range indicates to verifier 310 that prover 330 was completing the challenge-response calculations either too slowly or too rapidly—thereby indicating prover 330 is not authentic.

In some embodiments, the verifier 310 and prover 330 may be running at the same clock frequency. In should be understood that this is not necessary. Verifier 310 and prover 330 need only be running at frequencies and/or performance ratio(s) that are known beforehand to the authentic system integrator. In an embodiment, the +/− range of the measured timer interval that indicates a prover 330 is authentic (e.g., ±10%) may be optionally programmed into verifier 310 after deployment (e.g., to account for manufacturing variation between prover 330 and verifier 310, new/different designs, and/or new/different manufacturing processes).

In an embodiment, power supply 340 is coupled to prover 330 to limit power consumption by prover during challenge-response protocol calculations. While the power to prover 330 is being limited, verifier 310 transmits a challenge message to prover 330 as part of a challenge-response protocol in order to authenticate prover 330. Verifier 310 measures a response time of prover 330 during the challenge-response protocol. The authentication of prover 330 is based on the response time of prover 330.

In an embodiment, verifier 310 may control power supply 340 to limit the power consumption by prover 330. In an embodiment, host 350 may control power supply 340 to limit the power consumption by prover 330. In an embodiment, verifier 310 may indicate to host system 350 a power limit for the power consumption by prover 330. In an embodiment, host 350 may monitor, rather than limit, the power consumption by prover 330. In this case, host 350 and/or verifier 310 may determine whether prover 330 has consumed too much, or too little, power to indicate that prover 330 is authentic. In another embodiment, verifier 310 may transmit a second message to prover 330 to indicate a clock frequency to be used by prover 330 during challenge-response protocol calculations.

Verifier 310 transmits a first challenge-response protocol message to prover 330 in order to cause prover 330 to perform challenge-response protocol calculations. Verifier 310 receives, from prover 330, a second challenge-response protocol message that is based on the challenge-response protocol calculations (and NVM secret value) performed by prover 330. Verifier 310 also times an interval associated with the time between the transmitting of the first challenge-response protocol message and the receiving of the second challenge-response protocol message. Based on the interval associated with the time between the transmitting of the first challenge-response protocol message, and the receiving of the second challenge-response protocol message, verifier 310 determines whether prover 330 is to be indicated to be authentic.

In an embodiment, verifier 310 uses interface 315 to transmit a first challenge-response protocol message and to receive a second challenge-response protocol message from prover 330, which is being powered by power supply 340. Optionally, interface 315 transmits a message to select a clock frequency that prover 330 is to use to calculate at least a part of the second challenge-response protocol message. In an embodiment, this clock-frequency selection message can be derived from the first challenge-response protocol message, and/or concealed within the first or other messages exchanged during the protocol. In some embodiments, the messages exchanged between the verifier 110 and prover 130 are also used to select what algorithms will be used for the calculation of values need for the challenge-response protocol. Verifier 310 uses timer 312 to measure a time interval associated with the time between the transmission of the first challenge-response protocol message and the receiving of the second challenge-response protocol message from prover 330.

Verifier 310 may also use the first interface to transmit an indicator of a power limit to power supply 340. This indicator of the power limit of power supply 340 may be transmitted via host 350. In particular, host 250 may control the power limit of power supply 240.

Figure 4:
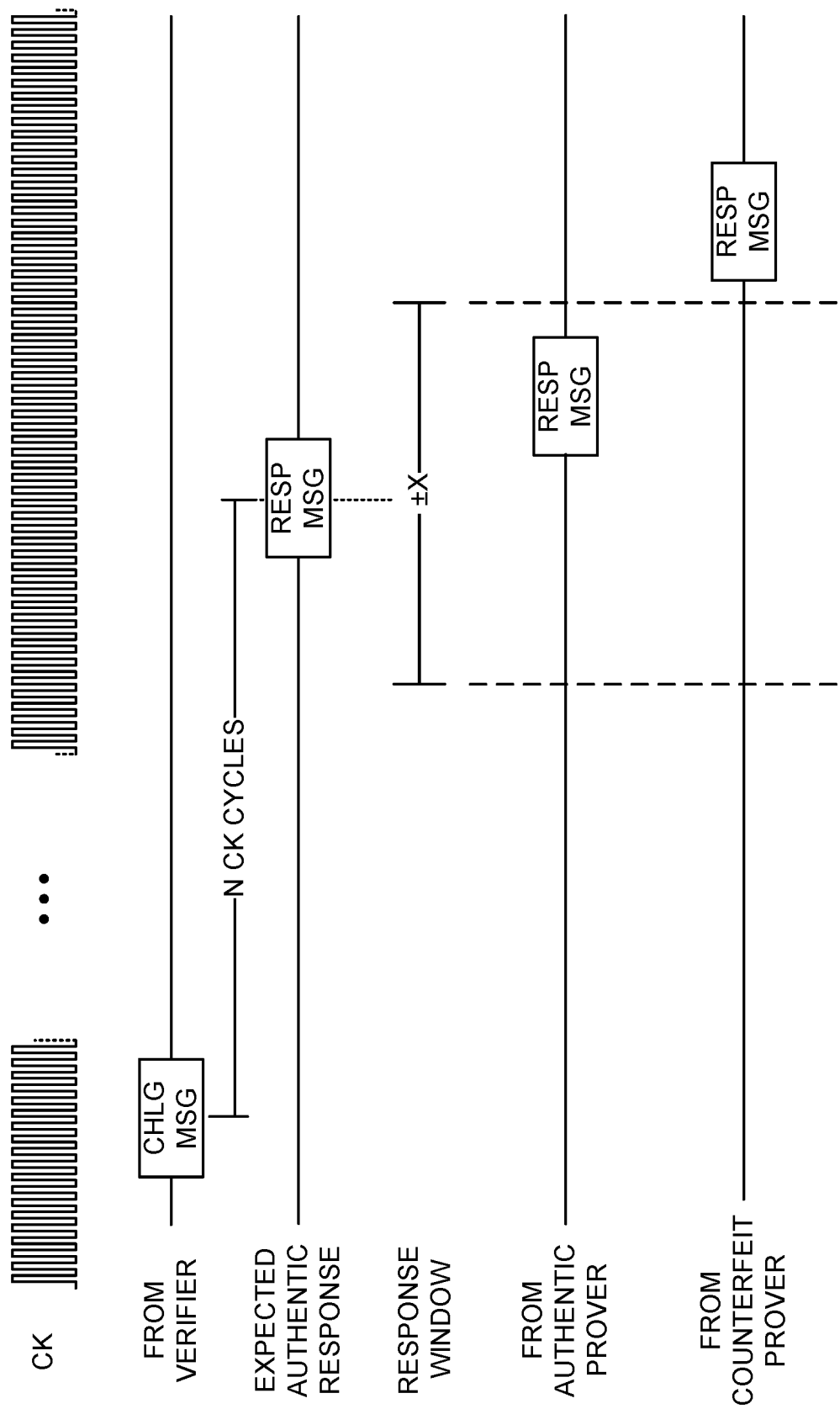
FIG. 4 is a diagram illustrating response timing assisted authentication.

FIG. 4 is a diagram illustrating response timing assisted authentication. In FIG. 4, a verifier (e.g., verifier 110) transmits a challenge message (illustrated by the "FROM VERIFIER" line.) The verifier is expecting a response from an authentic prover (e.g., prover 130) approximately N clock cycles later (illustrated by the "EXPECTED AUTHENTIC RESPONSE" line and the "CK" line.) Because there will be some variation in the number of clock cycles the prover takes to calculate a response, and also some variation in the time to communicate the challenge and the response messages, the verifier allows an authentic response to be received within a window of time and be considered an authentic response. This is illustrated by the "RESPONSE WINDOW" line. This line illustrates a response window that is +/−X number of clock cycles. A response from an authentic prover will arrive within this response window. This is illustrated by the "FROM AUTHENTIC PROVER" line showing a response message within the response window. A response from a counterfeit prover may arrive outside of the response window. This is illustrated by the "FROM COUNTERFEIT PROVER" line showing a response message outside of the response window.

FIG. 5 is a flowchart illustrating a method of authenticating a device. Steps illustrated in FIG. 5 may be performed by one or more of system 100, system 200, system 300, and/or their components. A power limited power supply is provided to a first device to be authenticated (502). For example, power limited power supply 140 may provide a limited power supply to prover 130.

A first challenge-response protocol message is transmitted to the first device in order to cause the first device to perform challenge-response protocol calculations (504). For example, verifier 110 may transmits, via communication link 120, a challenge message to prover 130. From the first device, a second challenge-response protocol message that is based on the challenge-response protocol calculations is received (506). For example, verifier 110 may receive the response message from prover 130 the contents of which are based on the challenge-response calculations performed by prover 130.

An interval associated with a time between the transmitting of the first challenge-response protocol message and receiving the second challenge-response protocol message is timed (508). For example, using timer 112, verifier 110 may time the interval between transmitting a challenge message and receiving the response to that challenge message. Based on this interval, verifier 110 may indicate whether prover 130 is indicated to be authentic.

For example, if an authentic prover 130 takes 100,000 verifier 110 clock cycles to complete an authentic challenge-response protocol calculation, verifier 110 may evaluate the interval measured by timer 112 to determine whether the interval falls between 90,000 and 110,000 verifier 110 clock cycles. An interval that falls outside of this range indicates to verifier 110 that prover 130 was completing the challenge-response calculations either too slowly or too rapidly—thereby indicating prover 130 is not authentic.

Figure 6:
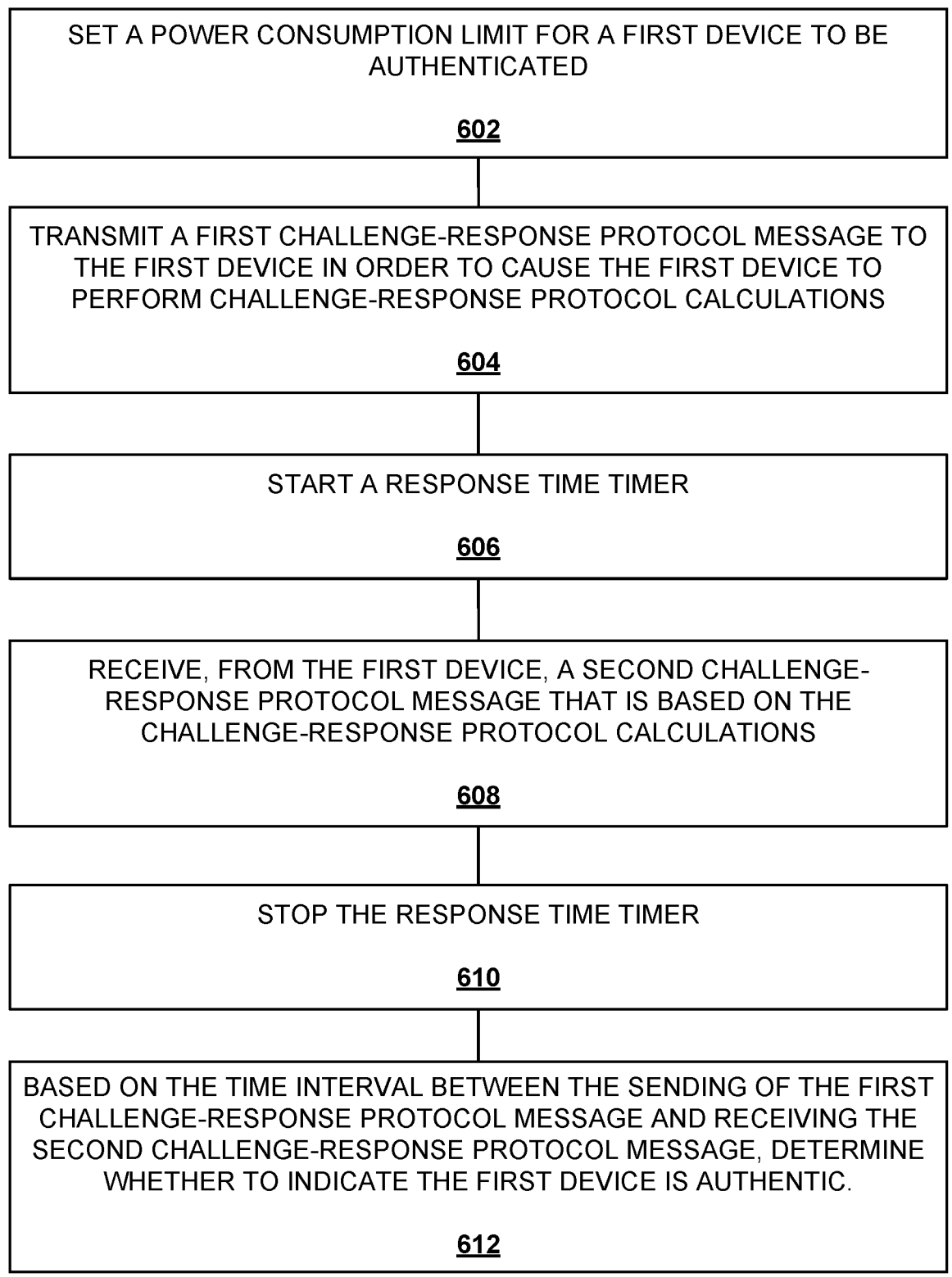
FIG. 6 is a flowchart illustrating a timer assisted method of determining the authenticity of a device.

FIG. 6 is a flowchart illustrating a timer assisted method of determining the authenticity of a device. Steps illustrated in FIG. 6 may be performed by one or more of system 100, system 200, system 300, and/or their components. A power consumption limit for a first device to be authenticated is set (602). For example, verifier 310 may configure power supply 340 to limit the power supplied to prover 330.

A first challenge-response protocol message is transmitted to the first device in order to cause the first device to perform challenge-response protocol calculations (604). For example, verifier 310 may transmit, via interface 315, a challenge message to prover 130. A response timer is started (606), or alternatively the current value of a free-running timer is recorded. For example, verifier 310 may start timer 312 in order to time an interval between the transmission of a challenge message to prover 330 and the reception of a corresponding response from prover 330.

From the first device, a second challenge-response protocol message that is based on the challenge-response protocol calculations is received (608). For example, verifier 310 may receive, via interface 315, the response message from prover 330 the contents of which are based on the challenge-response calculations performed by prover 330. The response timer is stopped (610), or alternatively the current value of a free-running counter is recorded. For example, when the response is received from prover 330, verifier 310 may stop timer 312 in order to complete the measurement of the interval between the transmission of a challenge message to prover 330 and the reception of a corresponding response from prover 330.

Based on the time interval between the sending of the first challenge-response protocol message and receiving the second challenge-response protocol message, it is determined whether to indicate the first device is authentic (612). For example, if an authentic prover 330 takes 100,000 verifier 310 clock cycles to complete an authentic challenge-response protocol calculation, verifier 310 may evaluate the interval measured by timer 312 to determine whether the interval falls between 90,000 and 110,000 verifier 310 clock cycles. If so, verifier 310 may indicate (e.g., to host 350) that prover 330 is authentic. If an interval that falls outside of this range, verifier 310 may indicate prover 330 is not authentic.

The methods, systems and devices described above may be implemented in computer systems, or stored by computer systems. The methods described above may also be stored on a non-transitory computer readable medium. Devices, circuits, and systems described herein may be implemented using computer-aided design tools available in the art, and embodied by computer-readable files containing software descriptions of such circuits. This includes, but is not limited to one or more elements of system 100, system 200, system 300, and/or their components. These software descriptions may be: behavioral, register transfer, logic component, transistor, and layout geometry-level descriptions. Moreover, the software descriptions may be stored on storage media or communicated by carrier waves.

Data formats in which such descriptions may be implemented include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Moreover, data transfers of such files on machine-readable media may be done electronically over the diverse media on the Internet or, for example, via email. Note that physical files may be implemented on machine-readable media such as: 4 mm magnetic tape, 8 mm magnetic tape, 3½ inch floppy media, CDs, DVDs, and so on.

Figure 7:
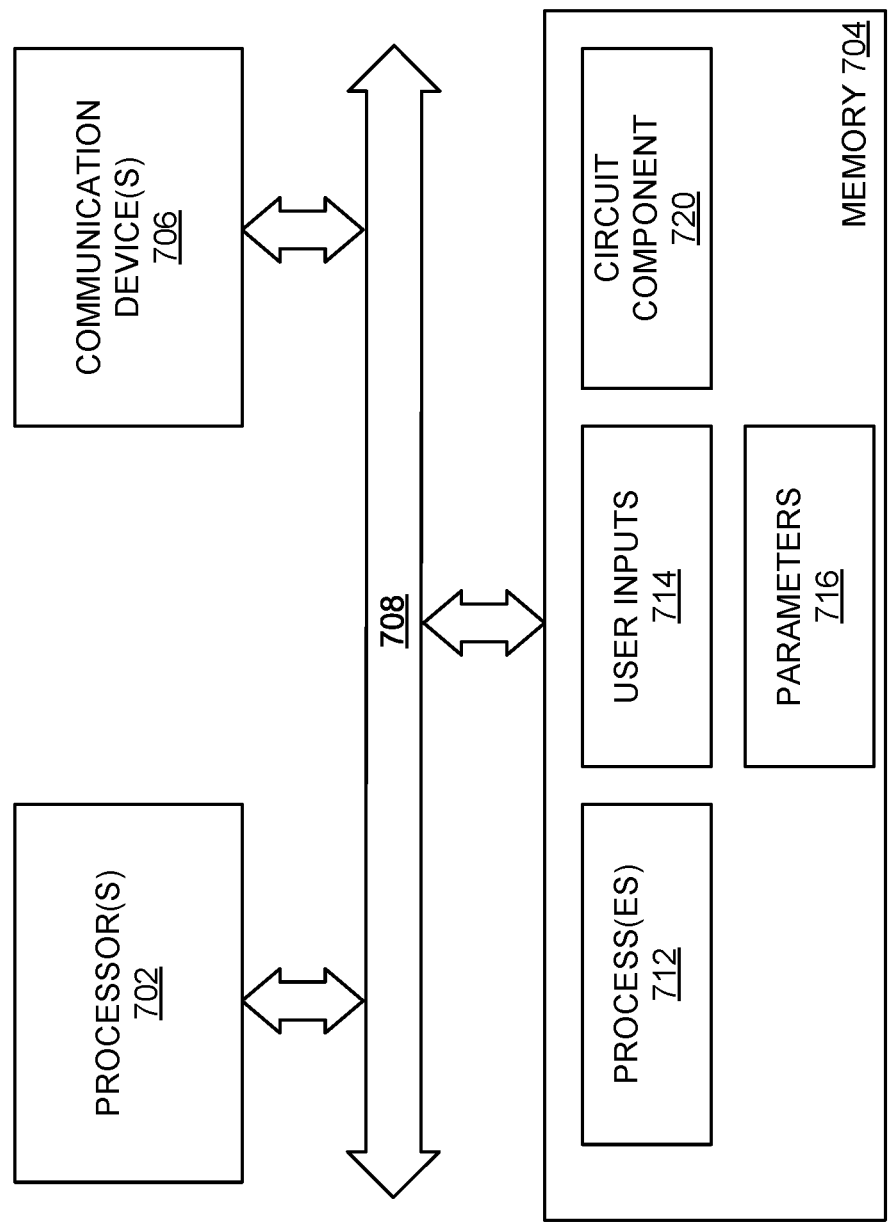
FIG. 7 is a block diagram illustrating a processing system.

FIG. 7 is a block diagram illustrating one embodiment of a processing system 700 for including, processing, or generating, a representation of a circuit component 720. Processing system 700 includes one or more processors 702, a memory 704, and one or more communications devices 706. Processors 702, memory 704, and communications devices 706 communicate using any suitable type, number, and/or configuration of wired and/or wireless connections 708.

Processors 702 execute instructions of one or more processes 712 stored in a memory 704 to process and/or generate circuit component 720 responsive to user inputs 714 and parameters 716. Processes 712 may be any suitable electronic design automation (EDA) tool or portion thereof used to design, simulate, analyze, and/or verify electronic circuitry and/or generate photomasks for electronic circuitry. Representation 720 includes data that describes all or portions of system 100, system 200, system 300, and/or their components, as shown in the Figures.

Representation 720 may include one or more of behavioral, register transfer, logic component, transistor, and layout geometry-level descriptions. Moreover, representation 720 may be stored on storage media or communicated by carrier waves.

Data formats in which representation 720 may be implemented include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Moreover, data transfers of such files on machine-readable media may be done electronically over the diverse media on the Internet or, for example, via email User inputs 714 may comprise input parameters from a keyboard, mouse, voice recognition interface, microphone and speakers, graphical display, touch screen, or other type of user interface device. This user interface may be distributed among multiple interface devices. Parameters 716 may include specifications and/or characteristics that are input to help define representation 720. For example, parameters 716 may include information that defines device types (e.g., NFET, PFET, etc.), topology (e.g., block diagrams, circuit descriptions, schematics, etc.), and/or device descriptions (e.g., device properties, device dimensions, power supply voltages, simulation temperatures, simulation models, etc.).

Memory 704 includes any suitable type, number, and/or configuration of non-transitory computer-readable storage media that stores processes 712, user inputs 714, parameters 716, and circuit component 720.

Communications devices 706 include any suitable type, number, and/or configuration of wired and/or wireless devices that transmit information from processing system 700 to another processing or storage system (not shown) and/or receive information from another processing or storage system (not shown). For example, communications devices 706 may transmit circuit component 720 to another system. Communications devices 706 may receive processes 712, user inputs 714, parameters 716, and/or circuit component 720 and cause processes 712, user inputs 714, parameters 716, and/or circuit component 720 to be stored in memory 704.

Implementations discussed herein include, but are not limited to, the following examples:

Example 1: An authentication system, comprising: a first device to transmit a first message to a second device as part of a challenge-response protocol in order to authenticate the second device; a power limited power supply coupled to the second device to limit power consumption by the second device during challenge-response protocol calculations; and, the first device to measure a response time of the second device during the challenge-response protocol.

Example 2: The authentication system of example 1, wherein an authentication of the second device is based on the response time of the second device.

Example 3: The authentication system of example 1, further comprising: a host system to relay communication between the first device and the second device.

Example 4: The authentication system of example 3, wherein the host system controls the power limited power supply to limit a power consumption by the second device.

Example 5: The authentication system of example 4, wherein the first device indicates to the host system a power limit for a power consumption by the second device.

Example 6: The authentication system of example 1, wherein the first device is to transmit a second message to the second device to indicate a clock frequency to be used by the second device during challenge-response protocol calculations.

Example 7: The authentication system of example 1, wherein the first message is sent via a first interface on the first device that is coupled directly to a second interface on the second device.

Example 8. A method, comprising: providing a power limited power supply to a first device to be authenticated; transmitting a first challenge-response protocol message to the first device in order to cause the first device to perform challenge-response protocol calculations; receiving, from the first device, a second challenge-response protocol message that is based on the challenge-response protocol calculations; and, timing an interval associated with a time between the transmitting of the first challenge-response protocol message and receiving the second challenge-response protocol message.

Example 9: The method of example 8, further comprising: based on the interval associated with a time between the transmitting of the first challenge-response protocol message and receiving the second challenge-response protocol message, determining that the first device is authentic.

Example 10: The method of example 8, further comprising: transmitting a third challenge-response protocol message to the first device to cause the first device to perform challenge-response protocol calculations using a selected clock frequency.

Example 11. The method of example 8, wherein the power limited power supply is provided to the first device by a host system.

Example 12: The method of example 11, wherein a second device is coupled to the host system and the second device transmits a message to the host system to indicate a selected limit for the power limited power supply.

Example 13: The method of example 11, wherein a second device is coupled to the first device to transmit the first challenge-response protocol message to the first device and to receive the second challenge-response protocol message from the first device.

Example 14: The method of example 13, wherein the second device, based on the interval associated with a time between the transmitting of the first challenge-response protocol message and receiving the second challenge-response protocol message, and the second challenge-response protocol message, is to determine whether the first device is authentic.

Example 15: A verifier integrated circuit, comprising: a first interface to transmit a first challenge-response protocol message and to receive a second challenge-response protocol message from a prover integrated circuit being powered by a power limited power supply; and, a timer to measure a time interval associated with a time between a transmission of the first challenge-response protocol message and a receiving of the second challenge-response protocol message from a prover integrated circuit.

Example 16: The verifier integrated circuit of example 15, wherein the first interface is to also transmit a message to select at least one of a clock frequency and a calculation algorithm that the prover integrated circuit is to use to calculate at least a part of the second challenge-response protocol message.

Example 17: The verifier integrated circuit of example 15, wherein the first interface is to transmit an indicator of a power limit of the power limited power supply.

Example 18: The verifier integrated circuit of example 17, wherein the indicator of the power limit of the power limited power supply is transmitted to a host system.

Example 19: The verifier integrated circuit of example 18, wherein the host system controls the power limit of the power limited power supply.

Example 20: The verifier integrated circuit of example 19, wherein the first challenge-response protocol message and the second challenge-response protocol message are transmitted via the host system.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. An authentication system, comprising:
    a first device to transmit a first message to a second device as part of a challenge-response protocol in order for the first device to authenticate the second device;
    a power limited power supply coupled to the second device to limit power consumption by the second device during the performance, by the second device, of challenge-response protocol calculations that are based on the first message; and,
    the first device to measure a response time of the second device during the challenge-response protocol while the power consumption by the second device is being limited by the power limited power supply during the challenge-response protocol calculations that are based on the first message.

2. The authentication system of claim 1, wherein an authentication of the second device is based on the response time of the second device.

3. The authentication system of claim 1, further comprising:
    a host system to relay communication between the first device and the second device.

4. The authentication system of claim 3, wherein the host system controls the power limited power supply to limit a power consumption by the second device.

5. The authentication system of claim 4, wherein the first device indicates to the host system a power limit for a power consumption by the second device.

6. The authentication system of claim 1, wherein the first device is to transmit a second message to the second device to indicate a clock frequency to be used by the second device during challenge-response protocol calculations.

7. The authentication system of claim 1, wherein the first message is sent via a first interface on the first device that is coupled directly to a second interface on the second device.

8. A method, comprising:
    providing a power limited power supply to a first device that is to be authenticated;
    transmitting a first challenge-response protocol message to the first device in order to cause the first device to perform challenge-response protocol calculations for the authentication of the first device that are based on the first challenge-response protocol message while the first device is being provided the power limited power supply;
    receiving, from the first device and for the authentication of the first device, a second challenge-response protocol message that is based on the challenge-response protocol calculations for the authentication of the first device that are based on the first challenge-response protocol message; and,
    timing an interval associated with a time between the transmitting of the first challenge-response protocol message to the first device for the authentication the first device and receiving the second challenge-response protocol message from the first device for the authentication of the first device.

9. The method of claim 8, further comprising:
    based on the interval associated with a time between the transmitting of the first challenge-response protocol message and receiving the second challenge-response protocol message, determining that the first device is authentic.

10. The method of claim 8, further comprising:
    transmitting a third challenge-response protocol message to the first device to cause the first device to perform the challenge-response protocol calculations using a selected clock frequency.

11. The method of claim 8, wherein the power limited power supply is provided to the first device by a host system.

12. The method of claim 11, wherein a second device is coupled to the host system and the second device transmits a message to the host system to indicate a selected limit for the power limited power supply.

13. The method of claim 11, wherein a second device is coupled to the first device to transmit the first challenge-response protocol message to the first device and to receive the second challenge-response protocol message from the first device.

14. The method of claim 13, wherein the second device, based on the interval associated with a time between the transmitting of the first challenge-response protocol message and receiving the second challenge-response protocol message, and the second challenge-response protocol message, is to determine whether the first device is authentic.

15. A verifier integrated circuit, comprising:
    a first interface to transmit, to a prover integrated circuit being powered by a power limited power supply, a first challenge-response protocol message for the authentication of the prover integrated circuit by the verifier integrated circuit, the verifier integrated circuit to also receive a second challenge-response protocol message that is based on the first challenge-response protocol message, is for the authentication of the prover integrated circuit, and is from the prover integrated circuit while the prover integrated circuit is being powered by the power limited power supply; and, a timer to measure a time interval associated with a time between a transmission of the first challenge-response protocol message to the prover integrated circuit and a receiving of the second challenge-response protocol message from the prover integrated circuit.

16. The verifier integrated circuit of claim 15, wherein the first interface is to also transmit a message to select at least one of a clock frequency and a calculation algorithm that the prover integrated circuit is to use to calculate at least a part of the second challenge-response protocol message.

17. The verifier integrated circuit of claim 15, wherein the first interface is to transmit an indicator of a power limit of the power limited power supply.

18. The verifier integrated circuit of claim 17, wherein the indicator of the power limit of the power limited power supply is transmitted to a host system.

19. The verifier integrated circuit of claim 18, wherein the host system controls the power limit of the power limited power supply.

20. The verifier integrated circuit of claim 19, wherein the first challenge-response protocol message and the second challenge-response protocol message are transmitted via the host system.

* * * * *